(12) United States Patent
Meisel et al.

(10) Patent No.: US 9,316,279 B2
(45) Date of Patent: Apr. 19, 2016

(54) VIBRATION ISOLATOR WITH LOW ELEVATION SEISMIC RESTRAINT

(71) Applicants: Paul Meisel, Dublin, OH (US); Richard Sherren, Pataskala, OH (US)

(72) Inventors: Paul Meisel, Dublin, OH (US); Richard Sherren, Pataskala, OH (US)

( * ) Notice: Subject to any disclaimer, the term of this patent is extended or adjusted under 35 U.S.C. 154(b) by 0 days.

(21) Appl. No.: 13/734,893

(22) Filed: Jan. 4, 2013

(65) Prior Publication Data

US 2014/0191104 A1 Jul. 10, 2014

(51) Int. Cl.
*F16M 1/00* (2006.01)
*F16F 3/04* (2006.01)
*E04H 9/02* (2006.01)

(52) U.S. Cl.
CPC ...... *F16F 3/04* (2013.01); *E04H 9/021* (2013.01); *F16F 2230/007* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,763,682 A * | 6/1930 | Wallace | ................ | 248/570 |
| 2,174,216 A * | 9/1939 | Rosenzweig | ................ | 248/612 |
| 2,209,862 A * | 7/1940 | Trott | ................ | 248/603 |
| 2,359,917 A * | 10/1944 | Hussman | ................ | 267/140.11 |
| 2,439,739 A * | 4/1948 | Hussman | ................ | 248/578 |
| 2,660,386 A * | 11/1953 | Munro | ................ | 248/574 |
| 2,781,443 A * | 2/1957 | Cargle | ................ | 362/485 |
| 3,145,012 A * | 8/1964 | Kfoury | ................ | 248/568 |
| 3,348,796 A * | 10/1967 | Baratoff et al. | ................ | 248/565 |
| 3,762,694 A * | 10/1973 | MacDonnell | ................ | 267/3 |
| 4,040,590 A * | 8/1977 | Baratoff | ................ | 248/569 |
| 4,079,926 A * | 3/1978 | Nunes | ................ | 267/176 |
| 4,356,992 A * | 11/1982 | Benkert | ................ | 248/578 |
| 4,496,130 A * | 1/1985 | Toyama | ................ | 248/585 |
| 4,537,382 A * | 8/1985 | Beck | ................ | 248/568 |
| 4,599,834 A * | 7/1986 | Fujimoto et al. | ................ | 52/167.8 |
| 4,893,796 A * | 1/1990 | Hickman et al. | ................ | 267/136 |
| 5,103,605 A * | 4/1992 | Sul | ................ | 52/167.1 |
| 5,201,155 A * | 4/1993 | Shimoda et al. | ................ | 52/167.7 |
| 5,456,047 A * | 10/1995 | Dorka | ................ | 52/167.4 |
| 5,595,371 A * | 1/1997 | Hukuda et al. | ................ | 267/34 |
| 5,667,202 A * | 9/1997 | Gwinn | ................ | 267/33 |
| 5,765,803 A * | 6/1998 | Graham | ................ | 248/624 |
| 7,028,969 B2 * | 4/2006 | Meisel et al. | ................ | 248/638 |
| 7,077,250 B2 * | 7/2006 | Folkens et al. | ................ | 188/380 |
| 7,165,870 B2 * | 1/2007 | McKenney | ................ | 362/369 |
| 7,757,441 B1 * | 7/2010 | Whittaker | ................ | 52/167.4 |
| 2004/0216398 A1 * | 11/2004 | Manos et al. | ................ | 52/167.1 |
| 2004/0245427 A1 * | 12/2004 | Meisel et al. | ................ | 248/562 |
| 2011/0018214 A1 * | 1/2011 | Kondo | ................ | 280/5.515 |

* cited by examiner

*Primary Examiner* — Monica Millner
(74) *Attorney, Agent, or Firm* — Kathleen K. Bowen (57) ABSTRACT

A vibration isolator with low elevation seismic restraint comprises a support member, at least two vibration isolating members, a top plate, a seismic snubber and a snubber limit plate. The vibration isolating members, are seated on the support member opposing end portions. The top plate has a middle portion and opposing end portions, wherein the top plate spans over the vibration isolating members, such that the vibration isolating members are between the support member and the top plate. The seismic snubber has a shaft element that is mounted to the top plate on one end. A snubbing limit plate is mounted to the support member such that it spans the U shaped support member middle portion, wherein the shaft member second end is between the snubbing limit plate, and the support member. The shaft member passes through the support member via a through-hole, and a first snubber element mounted to the shaft element second end, such that seismic movement is limited by the snubbing limit plate and the support plate.

19 Claims, 8 Drawing Sheets

VIBRATION ISOLATOR WITH LOW ELEVATION SEISMIC RESTRAINT

This application claims the benefit of U.S. Provisional Application No. 61583173 filed Jan. 4, 2012.

BACKGROUND

This invention is in the field of vibration and seismic isolators. Specifically this invention relates to a seismic isolators intended as a replacement for traditional type isolators.

Typically traditional type isolators are used for large pieces of equipment, often placed outdoors. Because of changes in building codes, there is a requirement for higher restraint capacities which render traditional type isolators obsolete. In the past, multiple smaller snubbing elements were used on this type of isolator, but under test conditions it was found that they did not share the load equally and could not be counted on to achieve their full design capacity A seismic isolator is desired which would not suffer from such load sharing issues. Further, a seismic isolator is desired in which the lower portion of the housing would have a lower profile to reduce the loads on the attachment hardware, and wherein the snubbing elements could be removed and replaced without disturbing the supported equipment.

SUMMARY

A vibration isolator with low elevation seismic restraint comprises a support member, at least two vibration isolating members, a top plate, a seismic snubber and a snubber limit plate. The vibration isolating members, are seated on the support member opposing end portions. The top plate has a middle portion and opposing end portions, wherein the top plate spans over the vibration isolating members, such that the vibration isolating members are between the support member and the top plate. The seismic snubber has a shaft element that is mounted to the top plate on one end. A snubbing limit plate is mounted to the support member such that it spans the U shaped support member middle portion, wherein the shaft member second end is between the snubbing limit plate, and the support member. The shaft member passes through the support member via a through-hole, and a first snubber element mounted to the shaft element second end, such that seismic movement is limited by the snubbing limit plate and the support plate

DETAILED DESCRIPTION

Figure 1:
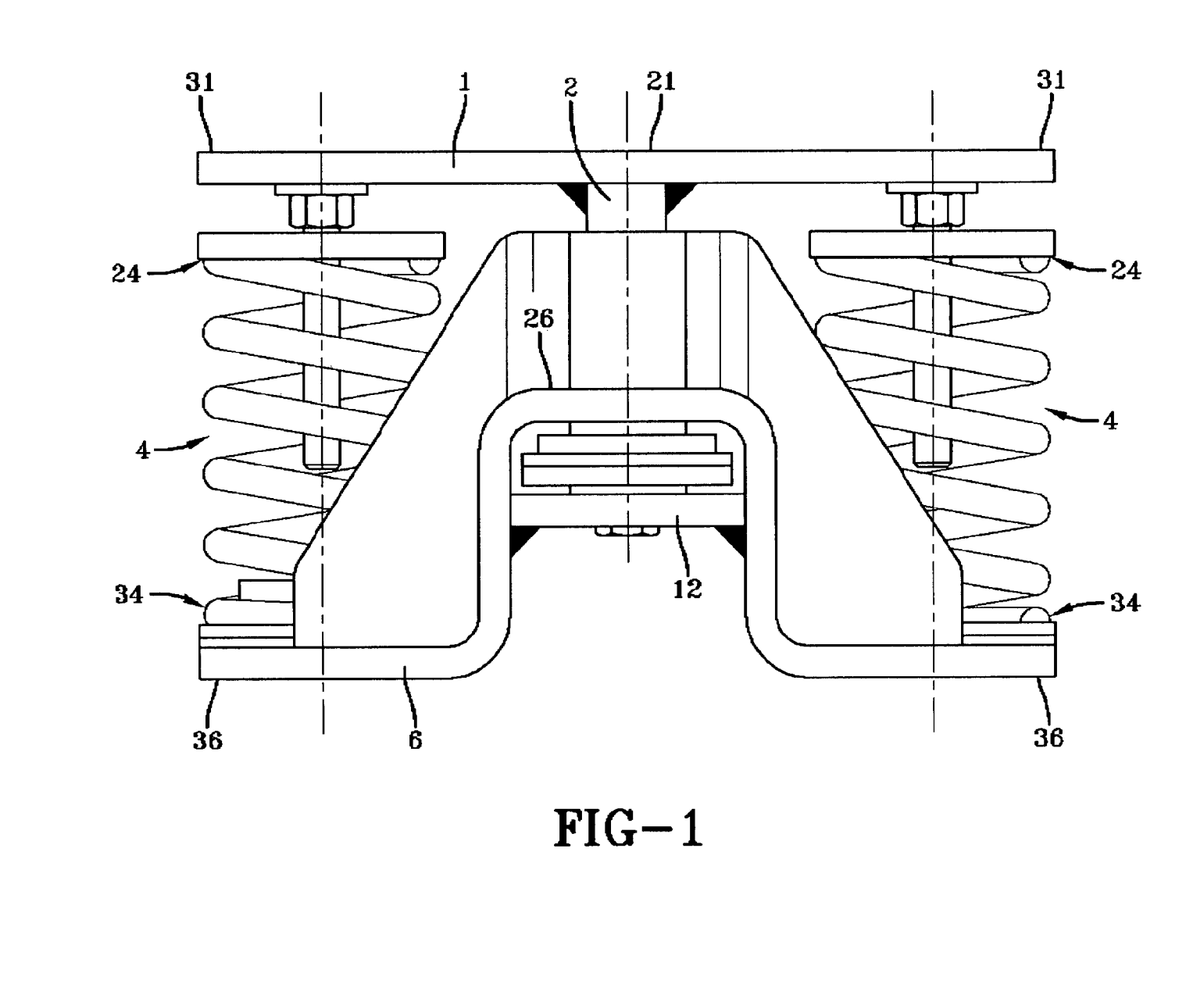
FIG. 1 is a side view of a vibration isolator with low elevation seismic restraint according to an aspect of the invention.
Figure 2:
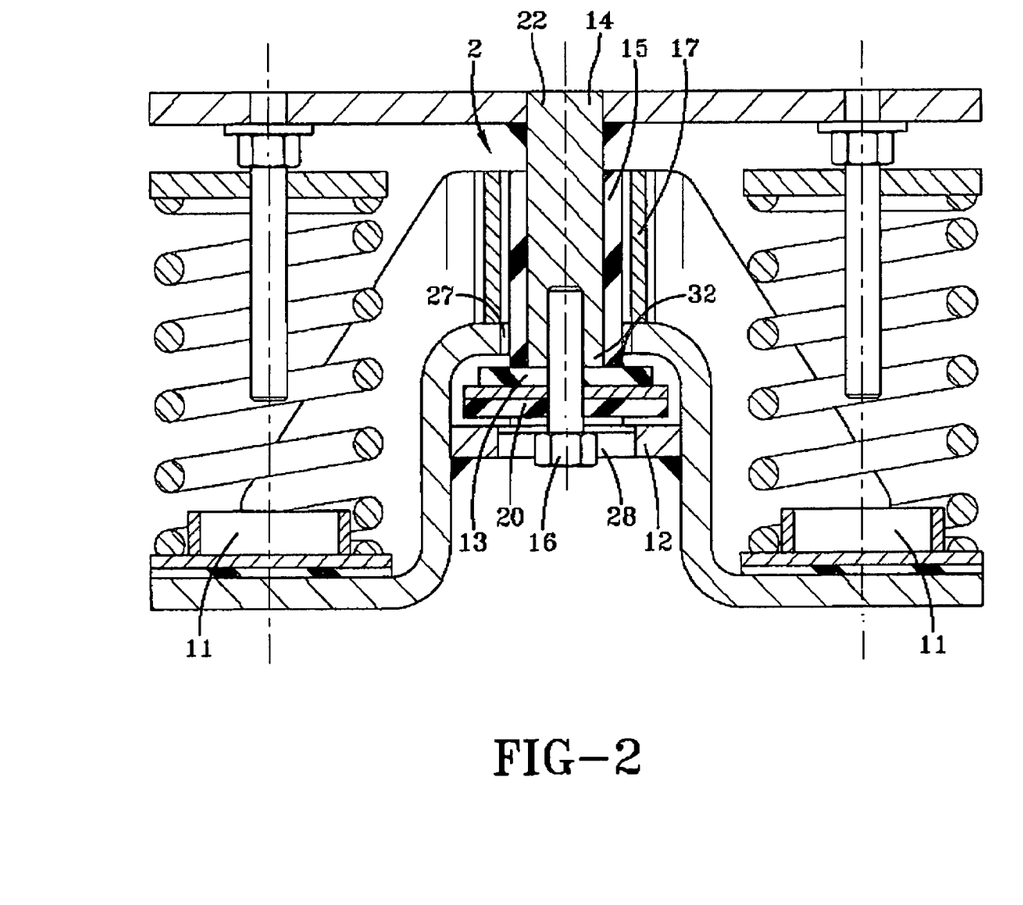
FIG. 2 is cross section of a vibration isolator with low elevation seismic restraint according to an aspect of the invention.
Figure 3:
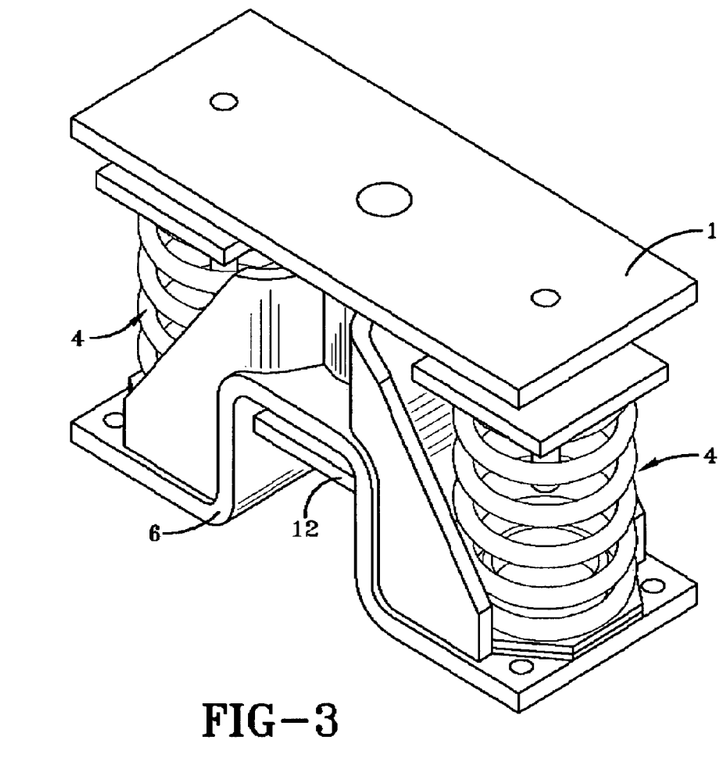
FIG. 3 is an isometric view of a vibration isolator with low elevation seismic restraint according to an aspect of the invention.
Figure 4:
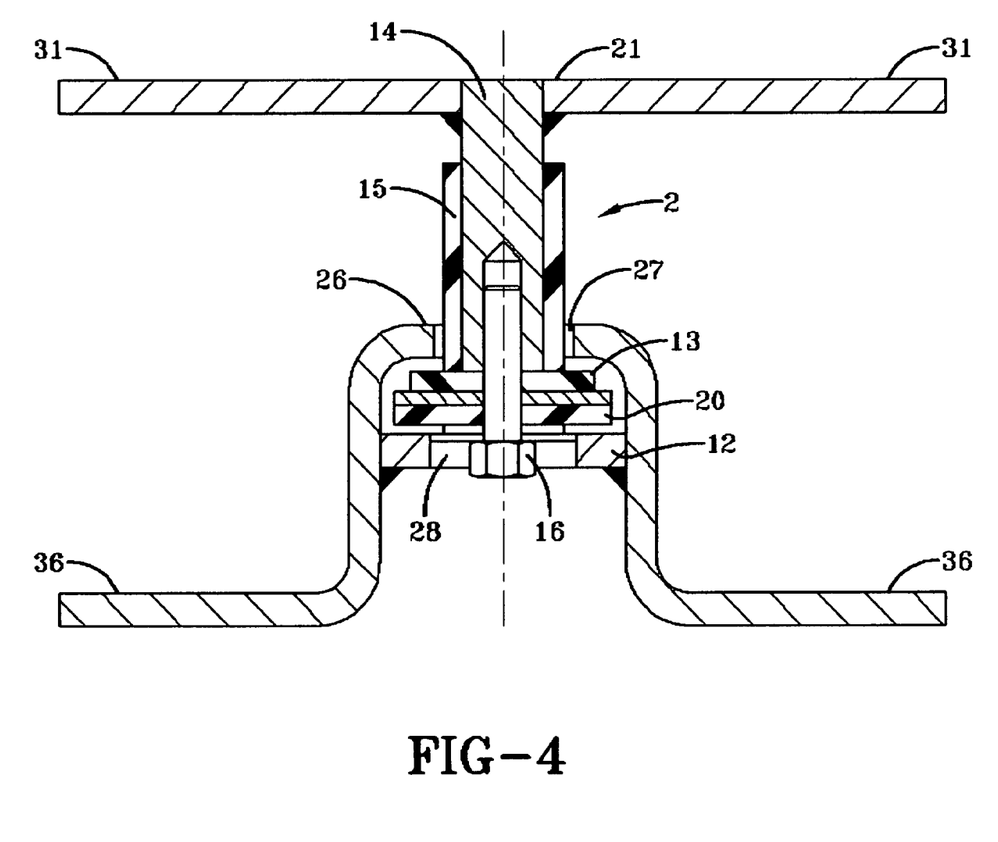
FIG. 4 is a cross section of a vibration isolator with low elevation seismic restraint according to an aspect of the invention.
Figure 5:
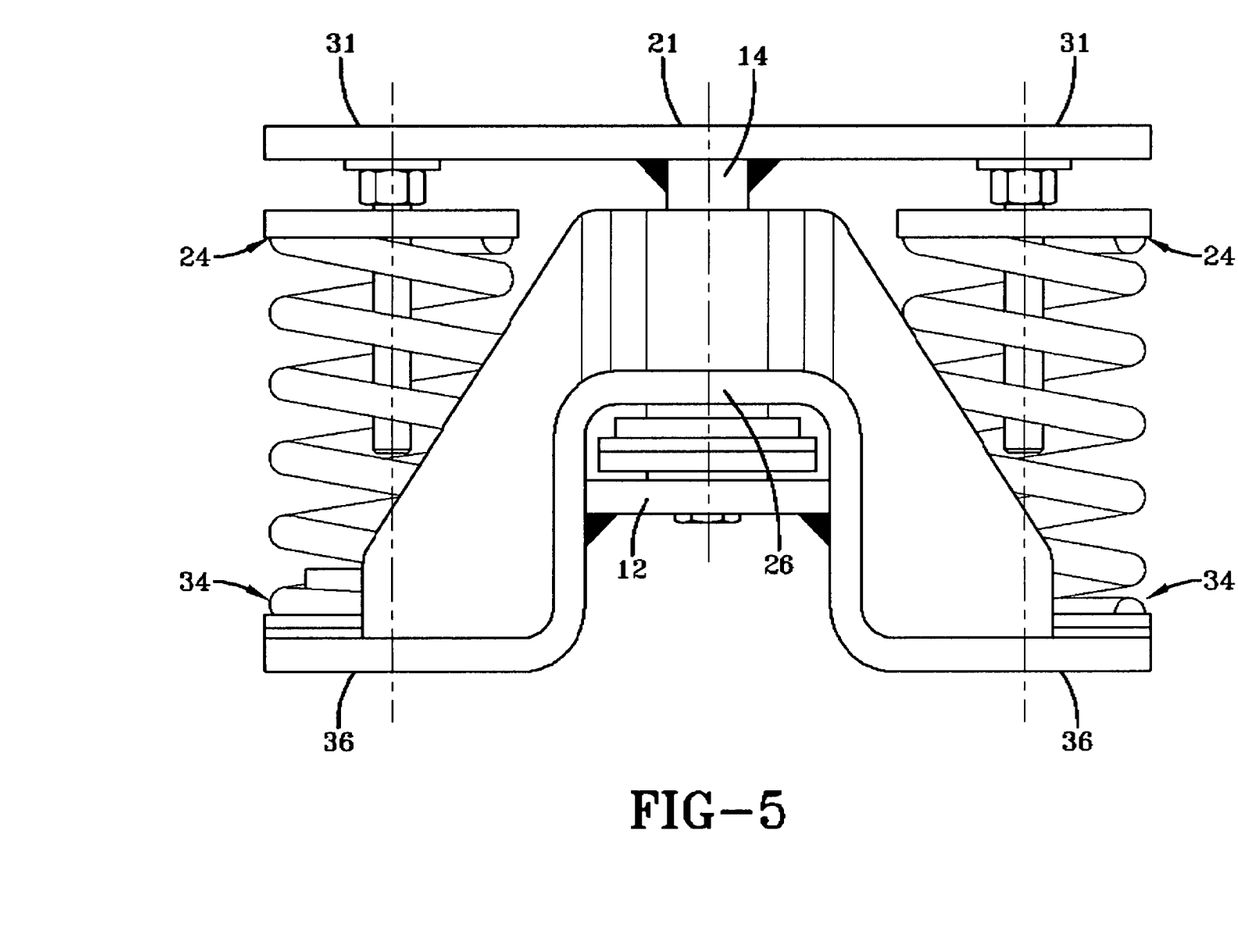
FIG. 5 is a side view of a vibration isolator with low elevation seismic restraint according to an aspect of the invention.
Figure 6:
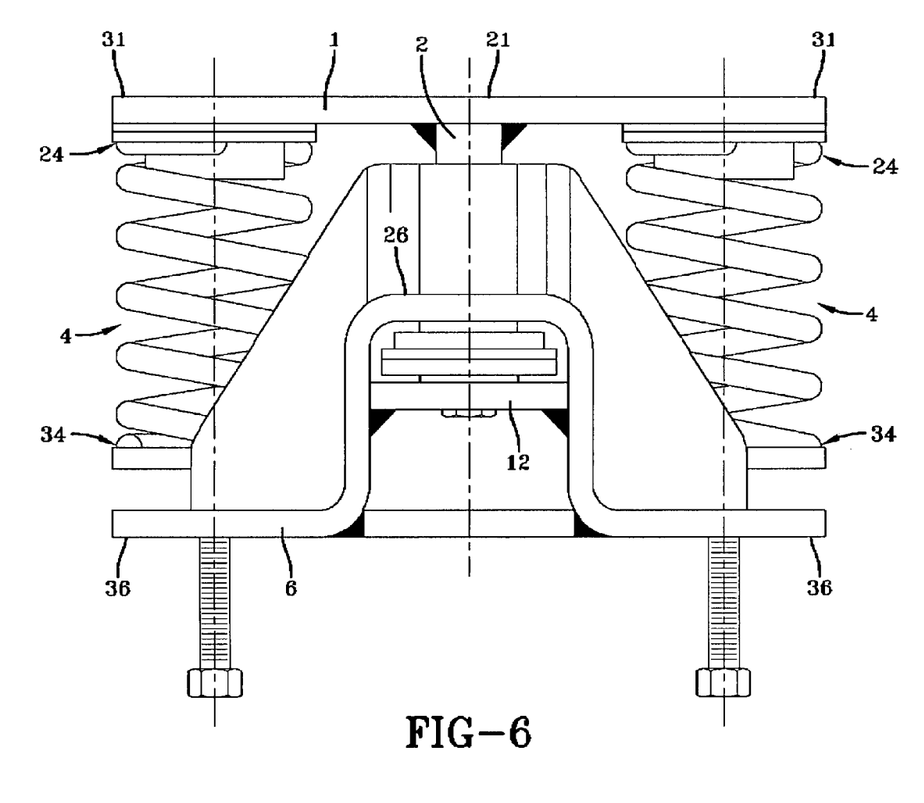
FIG. 6 is a side view of a vibration isolator with low elevation seismic restraint according to an aspect of the invention.
Figure 7:
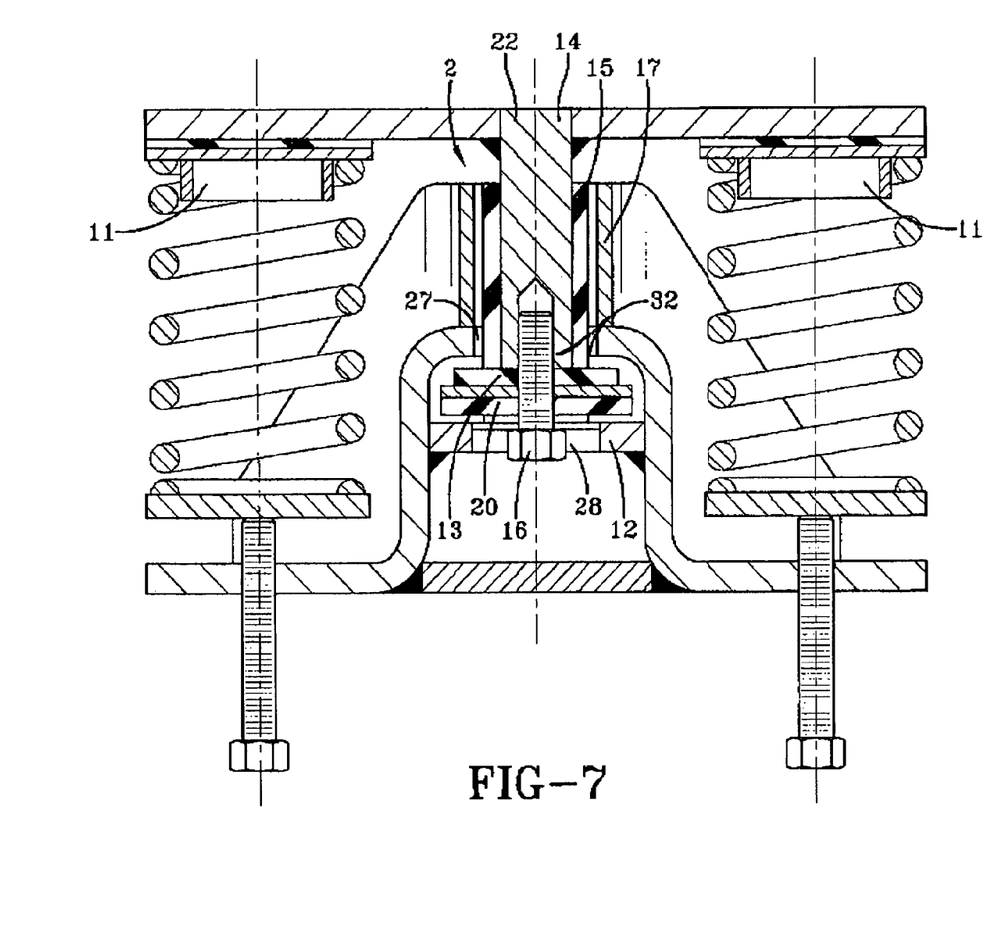
FIG. 7 is a cross section of a vibration isolator with low elevation seismic restraint according to an aspect of the invention.
Figure 8:
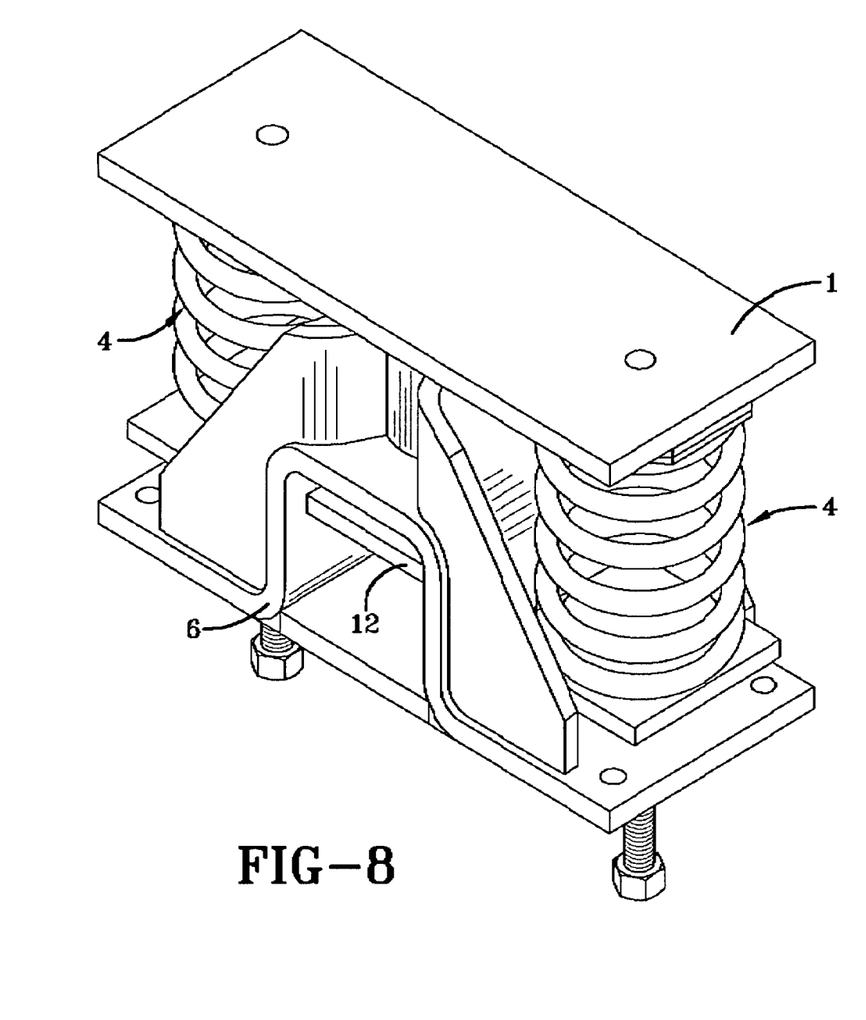
FIG. 8 is an isometric view of a vibration isolator with low elevation seismic restraint according to an aspect of the invention.

Various aspects of the invention are presented in FIGS. 1-4 which are not drawn to scale and in which like components are numbered alike. Referring now to FIGS. 1-4, according to an aspect of the invention, a vibration isolator with low elevation seismic restraint comprises a support member, at least two vibration isolating members, a top plate, a seismic snubber and a snubber limit plate.

The support member 6 has a middle portion 26 and opposing end portions 36, wherein the middle portion 26 is U shaped. The support member is the portion of the seismic isolator which would be mounted to the mounting surface. In a typical installation the opposing end portions would be mounted to the mounting surface, but alternately it could be a rail installation. The support member middle portion 26 has a through hole 27.

The vibration isolating members 4, each have a first end 24, and a second end 34, wherein the vibration isolating members second ends 34 are seated on the support member opposing end portions 36. According to an aspect of the invention, the vibration isolating members are springs. If they are springs, then they are seated on the support member in spring cups 11 to ensure that they maintain position.

The top plate 1 has a middle portion 21 and opposing end portions 31, wherein the top plate 1 spans over the vibration isolating members 4, and wherein the vibration isolating members first ends 24 are mounted to the top plate end portions 31. The top plate is positioned such that the vibration isolating members are between the top plate and the support member 6 and the top plate is relatively parallel to the support member 6 opposing end portions. The support member is situated such that the U shaped middle portion brings the support member closer to the top plate than the support member opposing end portions.

The seismic snubber 2 has a shaft element 14 having a first end 22 and a second end 32, wherein the seismic snubber shaft element first end 22 is mounted to the top plate 1. The first end of this seismic snubber shaft element is the portion of the snubber which is mounted to the top plate 1. The shaft element may be removeably mounted, or the shaft element may be integrally mounted to the top plate. The seismic snubber shaft element 14 passes through the support member through hole 27.

The first snubber element 13 is mounted to the seismic snubber shaft element second end 32. There may also be a second snubber element 20 which would be separated from the first snubber element 13 by a snubber middle plate. The first and second snubber elements are mounted to the seismic snubber shaft element 14 by a mounting mechanism. According to an aspect of the invention, a screw 16 is threaded into the seismic snubber shaft element second end. Washers may be fitted to the screw to ensure the attachment of the snubber elements. According to an aspect of the Invention, the snubber elements are neoprene.

The snubbing limit plate 12 is mounted such that it spans the U shaped support member middle portion 26, wherein the seismic snubber shaft element second end 32 is between the snubbing limit plate 12, and the support member 6. The snubbing limit plate 12 has an access hole 28 and the mounting mechanism passes through the access hole 28, and into the seismic snubber shaft element second end, wherein both the first and second snubber elements are large enough such that they will not pass through the access hole.

To provide seismic isolation in both the vertical and horizontal direction, there may further be a lateral snubbing element 15, which slides over the seismic snubber shaft element 14. The support member through hole 27 is of sufficient size to allow clearance for the lateral snubbing element 15 to be passed through, with clearance. According to an aspect of the invention, the lateral snubbing element is neoprene. According to a further aspect of the invention, the Support member through hole 27 is of sufficient size to allow said lateral snubbing element to pass through with clearance. According to a further aspect of the invention, the access hole 28 is also of sufficient size to allow the lateral snubbing element to pass through with clearance.

Additional features are the ability to mix and match spring coils with restraint housings to enable isolators to be optimized for the site conditions. Also, the isolator is made in such a way so it can be installed right side up or upside down. This allows the connections between the isolator and the equipment and the isolator and the structure to be optimized as well.

According to an aspect of the invention, the unit is designed so that the screw 16 can be removed, which in turn allows any spacers, washers and snubbing elements to be slid out to the sides, and the lateral snubbing element 15 to be dropped out the bottom. This allows for replacement of the snubbing element in the field, while installed.

According to an aspect of the invention, the unit may also have adjustment screws for the vibration isolating members, allowing for the adjustment of the stiffness of the vibration isolating members. These screws may extend through the top plate such that the vibration isolating members can be adjusted after installation of the unit. In an alternate embodiment, these screws may extend through the support member.

We claim:

1. A vibration isolator with low elevation seismic restraint for mounting equipment to a mounting surface, comprising:
    support member having a middle portion and opposing end portions, wherein said middle portion is U shaped;
    at least two vibration isolating members, each having a first end, and a second end, wherein said vibration isolating members second ends are seated on said support member opposing end portions,
    a top plate having a middle portion and opposing end portions, wherein said top plate spans over said vibration isolating members, such that said vibration isolating members are between said support member and said top plate, and wherein said vibration isolating members first ends are mounted to said top plate end portions, wherein said support member is situated such that said U shaped middle portion brings said support member closer to said top plate than said support member opposing end portions,
    a seismic snubber having a shaft element having a first end and a second end, wherein said seismic snubber shaft element first end is mounted to said top plate and further comprising a snubbing limit plate which is mounted such that it spans the U shaped support member middle portion, wherein said seismic snubber shaft element second end is between said snubbing limit plate, and said support member, wherein said shaft member passes through said support member via a through-hole, and a first snubber element mounted to said shaft element second end, such that seismic movement is limited by said snubbing limit plate and said support member.

2. The vibration isolator of claim 1 wherein said vibration isolating members are springs.

3. The vibration isolator of claim 2 further comprising spring cups, wherein said springs are seated on said support member in said spring cups to ensure that they maintain position.

4. The vibration isolator of claim 1 wherein said first snubber element is neoprene.

5. The vibration isolator of claim 1 wherein said seismic snubber shaft element first end is removeably mounted to said top plate via a mounting mechanism.

6. The vibration isolator of claim 1 wherein said seismic snubber shaft element first end is integrally mounted to said top plate.

7. The vibration isolator of claim 1 further comprising a second snubber element which would be separated from said first snubber element by a snubber middle plate.

8. The vibration isolator of claim 7 wherein said first and second snubber elements are mounted to said snubber via said seismic snubber shaft element.

9. The vibration isolator of claim 8 wherein said first and second snubber elements are mounted to said seismic snubber shaft element by a screw which is threaded into the seismic snubber shaft element second end.

10. The vibration isolator of claim 9 wherein washers are fitted to the screw to ensure the attachment of the snubber elements.

11. The vibration isolator of claim 7 wherein said second snubber element is neoprene.

12. The vibration isolator of claim 1 further comprising a lateral snubbing element.

13. The vibration isolator of claim 1 further comprising a lateral snubbing element wherein said lateral snubbing element slides over said seismic snubber shaft element, and wherein said support member through hole is of sufficient size to allow said lateral snubbing element to pass through with a clearance.

14. A vibration isolator with low elevation seismic restraint for mounting equipment to a mounting surface, comprising:
    support member having a middle portion and opposing end portions, wherein said middle portion is U shaped;
    at least two vibration isolating members, each having a first end, and a second end, wherein said vibration isolating members second ends are seated on said support member opposing end portions,
    a top plate having a middle portion and opposing end portions, wherein said top plate spans over said vibration isolating members, such that said vibration isolating members are between said support member and said top plate, and wherein said vibration isolating members first ends are mounted to said top plate end portions, wherein said support member is situated such that said U shaped middle portion brings said support member closer to said top plate than said support member opposing end portions,
    a seismic snubber having a shaft element having a first end and a second end, wherein said seismic snubber shaft element first end is mounted to said top plate and further comprising a snubbing limit plate which is mounted such that it spans the U shaped support member middle portion, wherein said seismic snubber shaft element second end is between said snubbing limit plate, and said support member, wherein said shaft member passes through said support member via a through-hole, and a first snubber element mounted to said shaft element second end, such that seismic movement is limited by said snubbing limit plate and said support member;

wherein said first snubber element is mounted to said snubber shaft element second end with a mounting mechanism, wherein said snubber limit plate has an access hole and wherein said mounting mechanism passes through said access hole, and into said seismic snubber shaft element second end, wherein said first snubber element is large enough such that it will not pass through said access hole.

15. A vibration isolator with low elevation seismic restraint for mounting equipment to a mounting surface, comprising:

support member having a middle portion and opposing end portions, wherein said middle portion is U shaped;

at least two vibration isolating members, each having a first end, and a second end, wherein said vibration isolating members second ends are seated on said support member opposing end portions, a top plate having a middle portion and opposing end portions, wherein said top plate spans over said vibration isolating members, such that said vibration isolating members are between said support member and said top plate, and wherein said vibration isolating members first ends are mounted to said top plate end portions, wherein said support member is situated such that said U shaped middle portion brings said support member closer to said top plate than said support member opposing end portions, a seismic snubber having a shaft element having a first end and a second end, wherein said seismic snubber shaft element first end is mounted to said top plate and further comprising a snubbing limit plate which is mounted such that it spans the U shaped support member middle portion, wherein said seismic snubber shaft element second end is between said snubbing limit plate, and said support member, wherein said shaft member passes through said support member via a through-hale, and a first snubber element mounted to said shaft element second end, such that seismic movement is limited by said snubbing limit plate and said support member further comprising a second snubber element which would be separated from said first snubber element by a snubber middle plate, wherein said first and second snubber elements are mounted to said snubber via said seismic snubber shaft element;

wherein said first and second snubber elements are mounted to said seismic snubber shaft element by a screw which is threaded into the seismic snubber shaft element second end;

wherein said snubber limit plate has an access hole and wherein said screw passes through said access hole, and into said seismic snubber shaft element second end, and wherein said first and second snubber elements are large enough such that they will not pass through said access hole.

16. The vibration isolator of claim 12 wherein said lateral snubbing element is neoprene.

17. The vibration isolator of claim 13 wherein said snubber limit plate has an access hole of sufficient size such size to allow said lateral snubbing element to pass through.

18. The vibration isolator of claim 1 further comprising adjustment screws for said vibration isolating members, wherein said screws extend through said top plate such that the vibration isolating members can be adjusted after installation of the unit.

19. The vibration isolator of claim 1 further comprising adjustment screws for said vibration isolating members, wherein said screws extend through said support member such that the vibration isolating members can be adjusted after installation of the unit.

* * * * *